United States Patent [19]

Hwang

[11] Patent Number: 5,000,768
[45] Date of Patent: Mar. 19, 1991

[54] FILTERING AND ABSORBING DEVICE FOR VEHICLE DISCHARGE PIPE

[76] Inventor: Feng-Lin Hwang, No. 21, Pa Te Rd., Chi Tu District, Keelung City, Taiwan

[21] Appl. No.: 473,567

[22] Filed: Feb. 1, 1990

[51] Int. Cl.⁵ ............................................ B01D 46/30
[52] U.S. Cl. ..................... 55/308; 55/385.3; 55/484; 55/485; 55/519
[58] Field of Search ........................ 55/308, 307, 385.3, 55/484, 485, 519

[56] References Cited

U.S. PATENT DOCUMENTS

| | | | |
|---|---|---|---|
| 1,716,479 | 6/1929 | Bilsky | 55/308 X |
| 1,716,481 | 6/1929 | Bilsky | 55/308 X |
| 1,946,744 | 2/1934 | Jones et al. | 55/308 |
| 2,288,943 | 7/1942 | Eastman | 55/308 X |
| 2,589,229 | 3/1952 | Dauphinee | 55/307 |
| 3,092,206 | 6/1963 | Moreau | 55/308 X |
| 3,556,734 | 1/1971 | Peterson | 55/308 X |
| 3,556,735 | 1/1971 | Epelman | 55/308 X |
| 3,698,875 | 10/1972 | Yamada | 55/308 X |
| 3,999,304 | 12/1976 | Doty | 55/485 X |

FOREIGN PATENT DOCUMENTS 808806 2/1959 United Kingdom ................. 55/485

Primary Examiner—Richard L. Chiesa
Attorney, Agent, or Firm—Browdy and Neimark

[57] ABSTRACT

A filtering and absorbing device for a vehicle's discharge pipe including a housing shell which is connectable to a vehicle's discharge pipe; the shell having a cross-sectional dimension larger than that of the discharge pipe's, cross openings properly spaced from each other on both the bottom and top walls of the housing shell's main body to allow ventilated boxes which contain activated carbon in grain form to be inserted in the housing shell to create a meandering passage so that waste fumes from the vehicle passing the ventilated boxes move along the meandering passage to be treated by activated carbon to produce cleaner air.

3 Claims, 3 Drawing Sheets

5,000,768

FILTERING AND ABSORBING DEVICE FOR VEHICLE DISCHARGE PIPE

FIELD OF THE INVENTION

This invention relates to a filtering and absorbing device for a vehicle's discharge pipe, and more particularly to a device which is connected onto the end of a vehicle's discharge pipe to filter away or absorb the poisonous substances and small solid particles included in discharged waste fumes in order to level down air pollution.

BACKGROUND OF THE INVENTION

Nowadays, vehicles are widely employed as major transportation means in daily living, but there is more suffering from more air-polluted living circumstances by discharge fumes from vehicle engines, and it is especially worse in urban cities where sometimes serious air levels threatens breathing. And even though waste fume standards have been set up to be followed for the protection of labor units, not much improvement has been perceived, and we are in need of some effective way to deal with the waste fumes from vehicles in order to reduce air pollution.

OBJECTS OF THE INVENTION

It is an object of the invention to solve the above-said problem by providing a device which can absorb poisonous substances and filter small solid particles in the waste fumes when connected to the end of a vehicle's discharge pipe. Features of the filtering and absorbing device are:

1. A housing shell having a diameter much larger than that of the discharge pipe of a vehicle, and having a cross-sectional dimension of an unblocked passage thereinside similar to that to the discharge pipe; so that back pressure will not be generated to affect engine operation.

2. A few ventilated boxes installed inside said housing shell; and wherein each box is filled with activated carbon in grain form to not only absorb poisonous substances but to filter away small solid particles contained in the discharged fumes, so that after this treatment, discharged fumes will not cause any harm, and 3. Wherein said ventilated boxes, after being employed for a while can be removed for a good cleaning, and the activated carbon included is replaceable by renewal, to maintain the boxes functions at best.

SUMMARY OF THE INVENTION

A filtering and absorbing device connectable to the end of a vehicle's discharge pipe comprising, a housing shell having a cross-sectional dimension much larger than the vehicle's discharge pipe; ventilated boxes containing activated carbon inserted inside of a housing shell of the device and spaced at suitable distance between each other; and wherein the activated carbon is in grain form and packed into the ventilated boxes. When connected to the rear end of a vehicle discharge pipe, this device absorbs the poisonous substances and filters away small solid particles contained in discharge fumes.

DETAILED DESCRIPTION OF THE INVENTION

Figure 1:
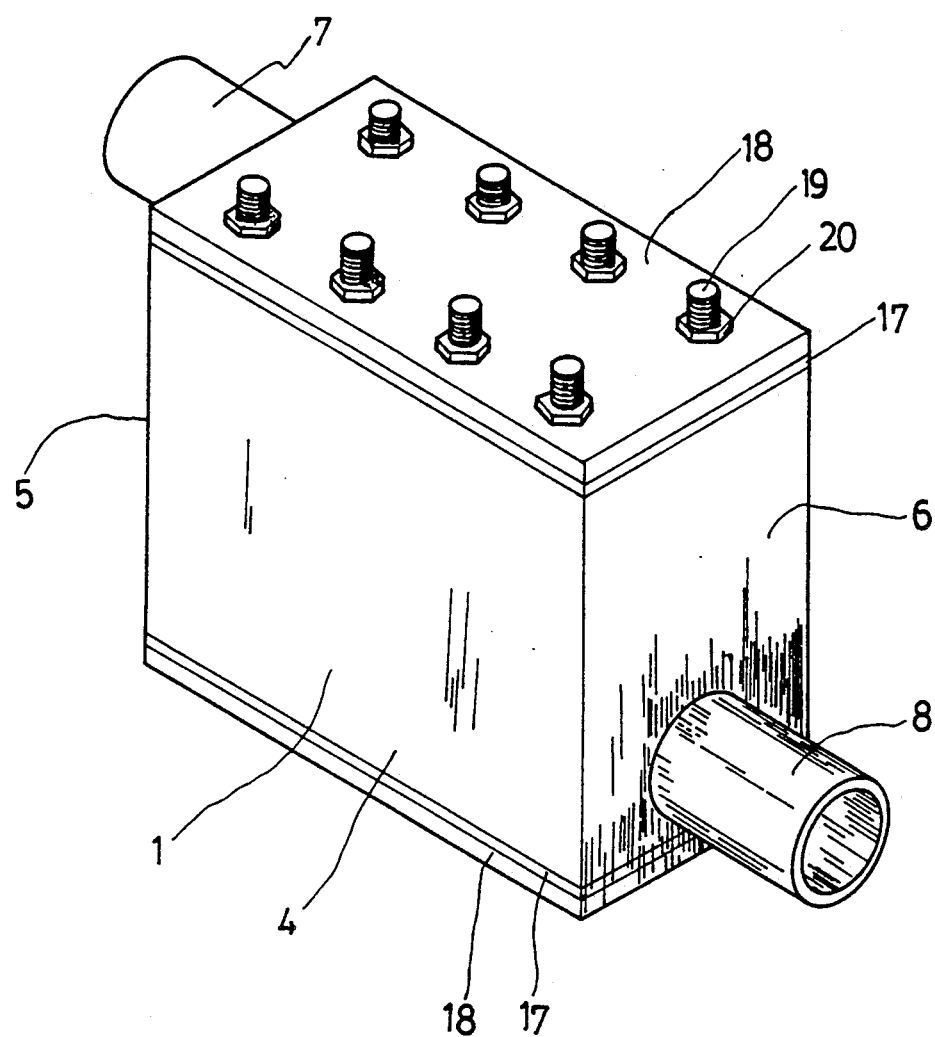
FIG. 1 is a perspective view of a preferred embodiment according to the invention.
Figure 2:
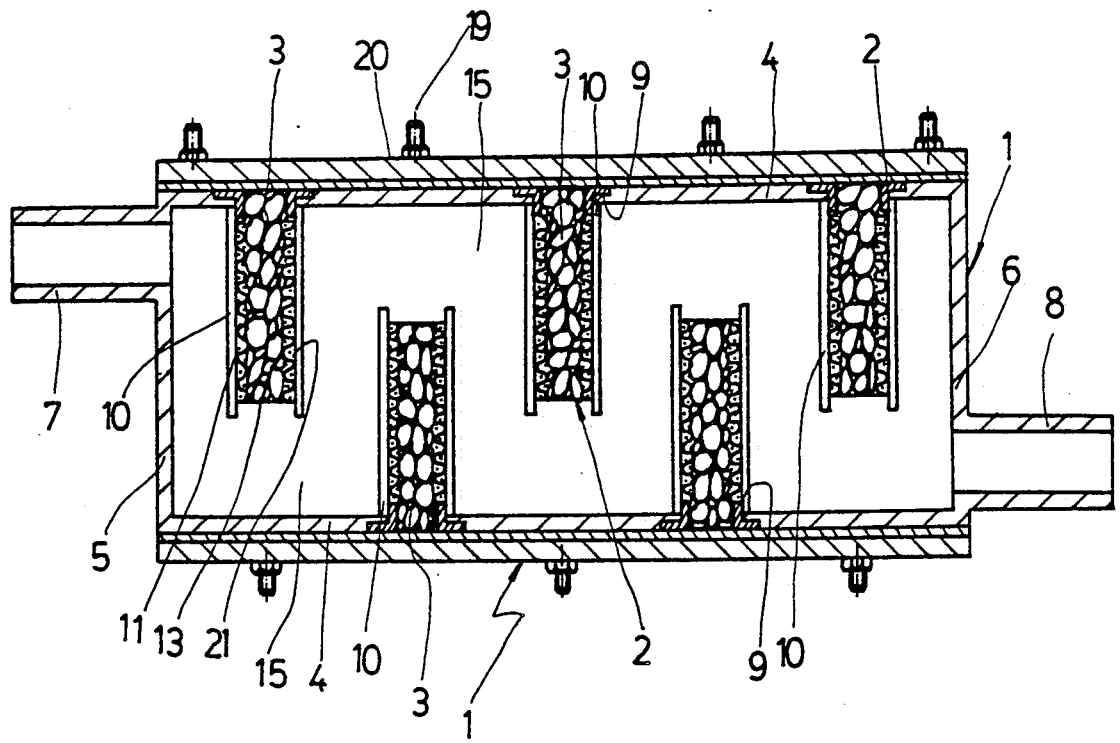
FIG. 2 is a view taken along a longitudinal cross-section in FIG. 1.
Figure 3:
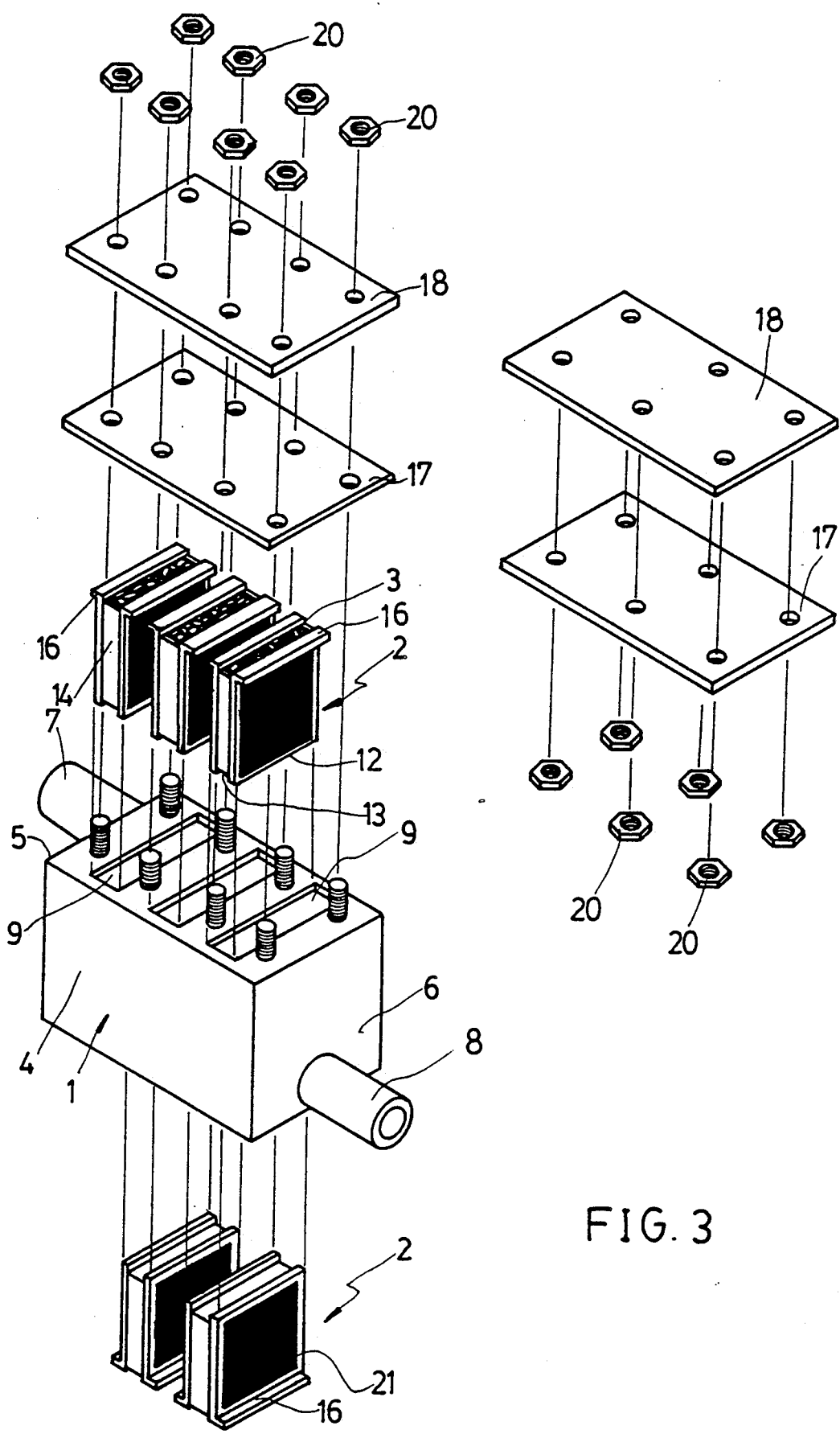
FIG. 3 is a structurally exploded view of FIG. 1.

Firstly, referring to FIGS. 1-3, the invention comprises:

a housing shell 1, ventilated box 2, and activated carbon 3, in grain form. The housing shell 1 is made of high temperature and corrosion-resistent metal plates, and the main body 4 thereof is a barrel, rectangular or any other suitable shape, and sealed with side plates 5, 6 at its two sides. To the upper half of side plate 5 is connected a connecting pipe 7 which has a connection to the rear end of a vehicle's discharge pipe (not shown) while the lower half of side plate 6 is connected to an outlet pipe 8 having a diameter dimension similar to that of the discharge pipe, and discharges a relatively cleaner air. On the bottom and top walls of main body 4, there are provided cross openings 9 properly spaced from each other, and upright U-grooves 10 based on each cross opening's inside lateral faces to allow the corresponding ventilated boxes 2 to be inserted. The ventilated box 2 is of shallow and rectangular shape, having front and back faces 11, 12 of interwoven corrosion-proof thin steel wires, the apertures of which are all smaller than the grains of activated carbon 3, so as to help contain said carbon. Both the box's width and thickness correspond to those of the cross opening 9, while its height 14 measures about two-thirds of the main body 4, to reserve a meandering passage 15 inside main body 4 of the same cross-sectional dimension as connecting pipe 7 even after main body 4 is inserted with boxes 2 so as to prevent the occurrence of back pressure. The outward end of ventilated box 2 is open for allowing grains of activated carbon 3 to enter therefrom to fill and provide peripherial flange 16 which can stablize ventilated box 2 by contact with the cross opening outside of the periphery. Both the top and bottom walls of main body 4 are covered with sealing sheet 17 and cover sheet 18 and locked together by means of screw bolts 19 and screw nuts 20.

Figure 4:
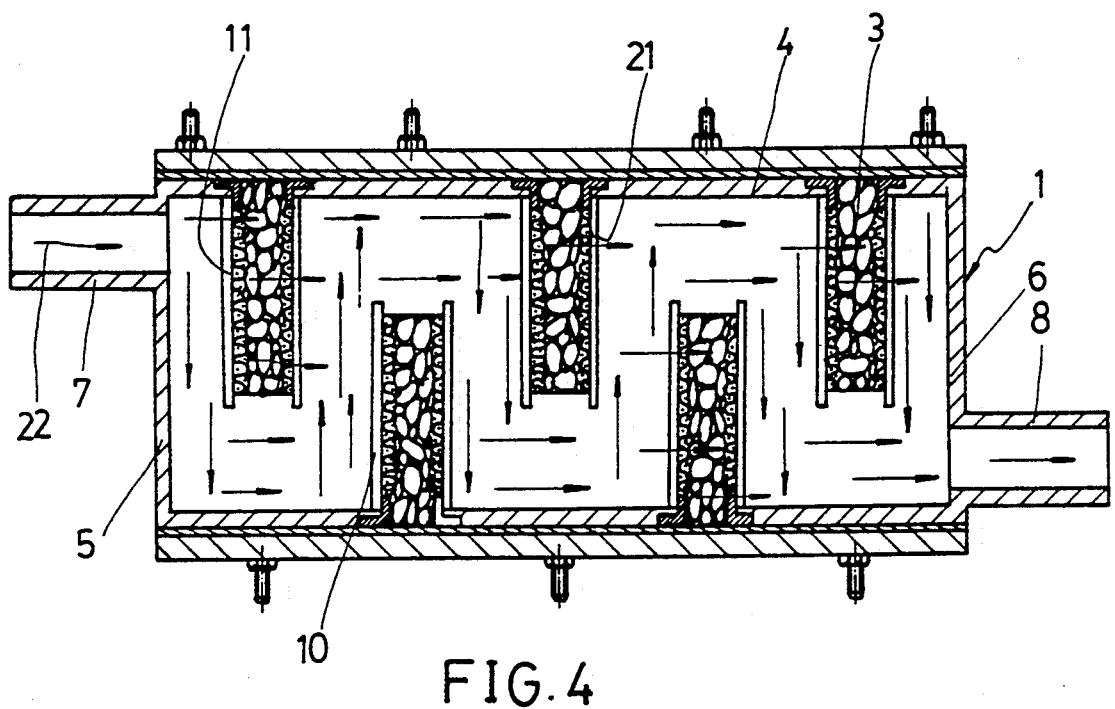
FIG. 4 shows how this invention performs when in use.

Now referring to FIG. 4; in operation when the invention device is connected to a vehicle's discharge pipe (not shown) by means of connecting pipe 7, and discharged fumes from the engine enter connecting pipe 7, as shown by arrow 22, partial fumes immediately enter ventilated box 2 through its front face thin steel wires 11 to filter away the small solid particles and absorb the poisonous gases included, by the treating of grains activated carbon 3, and gases leave the box through its back face thin steel wires 12, while partial fumes move along meandering passage 15 some way before they first enter a ventilated box 2 to take such filtering and absorbing treatment, so that the waste fumes when departing from outlet pipe 8 must have already passed some ventilated boxes 2 to be treated to turn into a relatively cleaner air without harm to human breathing.

After used for a period, this invention device should be taken off of the discharge pipe and renewed with activated carbon in order to maintain its normal effects of filtering and absorbing functions.

I claim:

1. A filtering and absorbing device for a vehicle's discharge pipe, comprising:
   a housing shell main body for connection to a vehicle's discharge pipe; said shell containing a plurality of ventilated boxes and having a cross-sectional dimension larger than that of said discharge pipe and sealed with plates at two sides, wherein an upper half of one side plate is connected to a pipe which is connectable to a vehicle discharge pipe, and a lower half of another side plate is connected to an outlet pipe having a diameter similar to that of the discharge pipe; cross openings in spaced apart relationship disposed on bottom and top faces of said housing shell with U-grooves inside two lateral faces to allow corresponding said ventilated boxes to be inserted therein;
   said ventilated boxes being of shallow and rectangular shape and having front and back faces of interwoven corrosion-proof, then steel wires having apertures smaller than grains of activated carbon contained in said boxes and a width and thickness corresponding to said cross openings and a height which measures about two-thirds of said housing shell main body, so that, when said main body is inserted with said boxes, a meandering passage having a cross-sectional dimension the same as said connecting pipe's is provided; wherein an outward end of each ventilated box is open to allow said grains of activated carbon to enter and fill said box and to provide a peripheral flange; and a sealing sheet and a cover sheet at top and bottom walls of said main body locked together by bolts and screws.

2. The device of claim 1, wherein said housing shell is of a barrel shape.

3. The device of claim 1, wherein said housing shell is of a rectangular shape.

* * * * *